(12) United States Patent
Grichnik et al.

(10) Patent No.: US 7,499,842 B2
(45) Date of Patent: Mar. 3, 2009

(54) PROCESS MODEL BASED VIRTUAL SENSOR AND METHOD

(75) Inventors: Anthony J. Grichnik, Peoria, IL (US); Michael Seskin, Cardiff, CA (US)

(73) Assignee: Caterpillar Inc., Peoria, IL (US)

( * ) Notice: Subject to any disclaimer, the term of this patent is extended or adjusted under 35 U.S.C. 154(b) by 442 days.

(21) Appl. No.: 11/281,978

(22) Filed: Nov. 18, 2005

(65) Prior Publication Data

US 2007/0118338 A1    May 24, 2007

(51) Int. Cl.
*G06F 17/10* (2006.01)
(52) U.S. Cl. .......................................................... 703/2
(58) Field of Classification Search ..................... 703/2; 706/44
See application file for complete search history.

(56) References Cited

U.S. PATENT DOCUMENTS

| | | | |
|---|---|---|---|
| 3,316,395 A | 4/1967 | Lavin | |
| 4,136,329 A | 1/1979 | Trobert | |
| 4,533,900 A | 8/1985 | Muhlberger et al. | |
| 5,014,220 A | 5/1991 | McMann et al. | |
| 5,163,412 A | 11/1992 | Neu et al. | |
| 5,262,941 A | 11/1993 | Saladin et al. | |
| 5,341,315 A | 8/1994 | Niwa et al. | |
| 5,386,373 A | 1/1995 | Keeler et al. | |
| 5,434,796 A | 7/1995 | Weininger | |
| 5,539,638 A | 7/1996 | Keeler et al. | |
| 5,548,528 A | 8/1996 | Keeler et al. | |
| 5,561,610 A | 10/1996 | Schricker et al. | |
| 5,566,091 A | 10/1996 | Schricker et al. | |
| 5,585,553 A | 12/1996 | Schricker | |
| 5,594,637 A | 1/1997 | Eisenberg et al. | |
| 5,598,076 A | 1/1997 | Neubauer et al. | |
| 5,604,306 A | 2/1997 | Schricker | |
| 5,604,895 A | 2/1997 | Raimi | |
| 5,608,865 A | 3/1997 | Midgely et al. | |
| 5,666,297 A | 9/1997 | Britt et al. | |

(Continued)

FOREIGN PATENT DOCUMENTS

EP        1103926        5/2001

(Continued)

OTHER PUBLICATIONS

G. Galperin, G. Tesauro, Parallel Monte-Carlo Simulation of Neural Network Controllers, available at http://www-fp.mcs.anl.gov/ccst/research/reports_pre1998/neural_network/galperin.html, printed on Mar. 11, 2005, pp. 1-6.

(Continued)

*Primary Examiner*—Russell Frejd
(74) *Attorney, Agent, or Firm*—Finnegan, Henderson, Farabow, Garrett & Dunner

(57) ABSTRACT

A method is provided for a virtual sensor system. The method may include establishing a virtual sensor process model indicative of interrelationships between a plurality of sensing parameters and a plurality of measured parameters, and obtaining a set of values corresponding to the plurality of measured parameters. The method may also include calculating the values of the plurality of sensing parameters simultaneously based upon the set of values corresponding to the plurality of measured parameters and the virtual sensor process model, and providing the values of the plurality of sensing parameters to a control system.

26 Claims, 6 Drawing Sheets

U.S. PATENT DOCUMENTS

| | | | |
|---|---|---|---|
| 5,682,317 A | 10/1997 | Keeler et al. | |
| 5,698,780 A | 12/1997 | Mizutani et al. | |
| 5,727,128 A | 3/1998 | Morrison | |
| 5,750,887 A | 5/1998 | Schricker | |
| 5,752,007 A * | 5/1998 | Morrison | 703/2 |
| 5,835,902 A | 11/1998 | Jannarone | |
| 5,842,202 A | 11/1998 | Kon | |
| 5,914,890 A | 6/1999 | Sarangapani et al. | |
| 5,925,089 A | 7/1999 | Fujime | |
| 5,950,147 A | 9/1999 | Sarangapani et al. | |
| 5,966,312 A | 10/1999 | Chen | |
| 5,987,976 A | 11/1999 | Sarangapani | |
| 6,086,617 A | 7/2000 | Waldon et al. | |
| 6,092,016 A | 7/2000 | Sarangapani et al. | |
| 6,119,074 A | 9/2000 | Sarangapani | |
| 6,145,066 A | 11/2000 | Atkin | |
| 6,195,648 B1 | 2/2001 | Simon et al. | |
| 6,199,007 B1 | 3/2001 | Zavarehi et al. | |
| 6,208,982 B1 | 3/2001 | Allen, Jr. et al. | |
| 6,223,133 B1 | 4/2001 | Brown | |
| 6,236,908 B1 | 5/2001 | Cheng et al. | |
| 6,240,343 B1 | 5/2001 | Sarangapani et al. | |
| 6,269,351 B1 | 7/2001 | Black | |
| 6,298,718 B1 | 10/2001 | Wang | |
| 6,370,544 B1 | 4/2002 | Krebs et al. | |
| 6,405,122 B1 | 6/2002 | Yamaguchi | |
| 6,438,430 B1 | 8/2002 | Martin et al. | |
| 6,442,511 B1 | 8/2002 | Sarangapani et al. | |
| 6,477,660 B1 | 11/2002 | Sohner | |
| 6,513,018 B1 | 1/2003 | Culhane | |
| 6,546,379 B1 | 4/2003 | Hong et al. | |
| 6,584,768 B1 | 7/2003 | Hecker et al. | |
| 6,594,989 B1 | 7/2003 | Hepburn et al. | |
| 6,698,203 B2 | 3/2004 | Wang | |
| 6,711,676 B1 | 3/2004 | Zomaya et al. | |
| 6,721,606 B1 | 4/2004 | Kaji et al. | |
| 6,725,208 B1 | 4/2004 | Hartman et al. | |
| 6,763,708 B2 | 7/2004 | Ting et al. | |
| 6,775,647 B1 | 8/2004 | Evans et al. | |
| 6,785,604 B2 | 8/2004 | Jacobson | |
| 6,810,442 B1 | 10/2004 | Lin et al. | |
| 6,823,675 B2 | 11/2004 | Brunell et al. | |
| 6,859,770 B2 | 2/2005 | Ramsey | |
| 6,859,785 B2 | 2/2005 | Case | |
| 6,865,883 B2 | 3/2005 | Gomulka | |
| 6,882,929 B2 | 4/2005 | Liang et al. | |
| 6,895,286 B2 | 5/2005 | Kaji et al. | |
| 6,935,313 B2 | 8/2005 | Jacobson | |
| 6,941,287 B1 | 9/2005 | Vaidyanathan et al. | |
| 6,952,662 B2 * | 10/2005 | Wegerich et al. | 703/2 |
| 6,976,062 B1 | 12/2005 | Denby et al. | |
| 7,000,229 B2 | 2/2006 | Gere | |
| 7,024,343 B2 | 4/2006 | El-Ratal | |
| 7,027,953 B2 | 4/2006 | Klein | |
| 7,117,079 B2 | 10/2006 | Streichsbier et al. | |
| 7,124,047 B2 | 10/2006 | Zhang et al. | |
| 7,127,892 B2 | 10/2006 | Akins et al. | |
| 7,174,284 B2 * | 2/2007 | Dolansky et al. | 703/2 |
| 7,178,328 B2 | 2/2007 | Solbrig | |
| 7,191,161 B1 | 3/2007 | Rai et al. | |
| 7,194,392 B2 * | 3/2007 | Tuken et al. | 703/2 |
| 7,213,007 B2 | 5/2007 | Grichnik | |
| 7,356,393 B1 | 4/2008 | Schlatre et al. | |
| 7,369,925 B2 | 5/2008 | Morioka et al. | |
| 2002/0014294 A1 | 2/2002 | Okano et al. | |
| 2002/0016701 A1 | 2/2002 | Duret et al. | |
| 2002/0042784 A1 | 4/2002 | Kerven et al. | |
| 2002/0049704 A1 | 4/2002 | Vanderveldt et al. | |
| 2002/0103996 A1 | 8/2002 | LeVasseur et al. | |
| 2002/0198821 A1 | 12/2002 | Munoz | |
| 2003/0018503 A1 | 1/2003 | Shulman | |
| 2003/0055607 A1 | 3/2003 | Wegerich et al. | |
| 2003/0093250 A1 | 5/2003 | Goebel | |
| 2003/0126053 A1 | 7/2003 | Boswell et al. | |
| 2003/0126103 A1 | 7/2003 | Chen et al. | |
| 2003/0130855 A1 | 7/2003 | Babu et al. | |
| 2003/0167354 A1 | 9/2003 | Peppers et al. | |
| 2003/0187567 A1 | 10/2003 | Sulatisky et al. | |
| 2003/0187584 A1 | 10/2003 | Harris | |
| 2003/0200296 A1 | 10/2003 | Lindsey | |
| 2003/0217021 A1 | 11/2003 | Jacobson | |
| 2004/0030420 A1 | 2/2004 | Ulyanov et al. | |
| 2004/0034857 A1 | 2/2004 | Mangino et al. | |
| 2004/0059518 A1 | 3/2004 | Rothschild | |
| 2004/0077966 A1 | 4/2004 | Yamaguchi et al. | |
| 2004/0122702 A1 | 6/2004 | Sabol et al. | |
| 2004/0122703 A1 | 6/2004 | Walker et al. | |
| 2004/0128058 A1 | 7/2004 | Andres et al. | |
| 2004/0135677 A1 | 7/2004 | Asam | |
| 2004/0138995 A1 | 7/2004 | Hershkowitz et al. | |
| 2004/0139041 A1 | 7/2004 | Grichnik | |
| 2004/0153227 A1 | 8/2004 | Hagiwara et al. | |
| 2004/0230404 A1 | 11/2004 | Messmer et al. | |
| 2004/0267818 A1 | 12/2004 | Hartenstine | |
| 2005/0047661 A1 | 3/2005 | Mauer | |
| 2005/0055176 A1 | 3/2005 | Clarke et al. | |
| 2005/0091093 A1 | 4/2005 | Bhaskaran et al. | |
| 2005/0209943 A1 | 9/2005 | Ballow et al. | |
| 2005/0210337 A1 | 9/2005 | Chester et al. | |
| 2005/0240539 A1 | 10/2005 | Olavson | |
| 2005/0261791 A1 | 11/2005 | Chen et al. | |
| 2005/0262031 A1 | 11/2005 | Saidi et al. | |
| 2005/0278227 A1 | 12/2005 | Esary et al. | |
| 2005/0278432 A1 | 12/2005 | Feinleib et al. | |
| 2006/0010057 A1 | 1/2006 | Bradway et al. | |
| 2006/0010142 A1 | 1/2006 | Kim et al. | |
| 2006/0010157 A1 | 1/2006 | Dumitrascu et al. | |
| 2006/0025897 A1 | 2/2006 | Shostak et al. | |
| 2006/0026270 A1 | 2/2006 | Sadovsky et al. | |
| 2006/0026587 A1 | 2/2006 | Lemarroy et al. | |
| 2006/0064474 A1 | 3/2006 | Feinleib et al. | |
| 2006/0068973 A1 | 3/2006 | Kappauf et al. | |
| 2006/0129289 A1 | 6/2006 | Kumar et al. | |
| 2006/0130052 A1 | 6/2006 | Allen et al. | |
| 2006/0229753 A1 | 10/2006 | Seskin et al. | |
| 2006/0229769 A1 | 10/2006 | Grichnik et al. | |
| 2006/0229852 A1 | 10/2006 | Grichnik et al. | |
| 2006/0229854 A1 | 10/2006 | Grichnik et al. | |
| 2006/0230018 A1 | 10/2006 | Grichnik et al. | |
| 2006/0230097 A1 | 10/2006 | Grichnik et al. | |
| 2006/0230313 A1 | 10/2006 | Grichnik et al. | |
| 2006/0241923 A1 | 10/2006 | Xu et al. | |
| 2006/0247798 A1 | 11/2006 | Subbu et al. | |
| 2007/0061144 A1 | 3/2007 | Grichnik et al. | |
| 2007/0094048 A1 | 4/2007 | Grichnik | |
| 2007/0094181 A1 | 4/2007 | Tayebnejad et al. | |
| 2007/0118338 A1 | 5/2007 | Grichnik et al. | |
| 2007/0124237 A1 | 5/2007 | Sundararajan et al. | |
| 2007/0150332 A1 | 6/2007 | Grichnik et al. | |
| 2007/0168494 A1 | 7/2007 | Liu et al. | |
| 2007/0179769 A1 | 8/2007 | Grichnik et al. | |
| 2007/0203864 A1 | 8/2007 | Grichnik | |
| 2008/0154811 A1 | 6/2008 | Grichnik et al. | |

FOREIGN PATENT DOCUMENTS

| | | |
|---|---|---|
| EP | 1367248 | 12/2003 |
| EP | 1418481 | 5/2004 |
| JP | 10-332621 | 12/1998 |
| JP | 11-351045 | 12/1999 |
| JP | 2002-276344 | 9/2002 |
| WO | WO 97/42581 | 11/1997 |
| WO | WO2002/057856 | 7/2002 |

WO  WO2006/017453  2/2006

OTHER PUBLICATIONS

U.S. Appl. No. 11/101,531 entitled "Process Model Monitoring Method and System," by Anthony J. Grichnik et al., filed on Apr. 8, 2005.
U.S. Appl. No. 11/101,556 entitled "Mahalanobis Distance Genetic Algorithm (MDGA) Method and System," by Anthony Grichnik et al., filed on Apr. 8, 2005.
U.S. Appl. No. 11/101,554 entitled "Zeta Statistic Process Method and System," by Anthony Grichnik et al., filed on Apr. 8, 2005.
U.S. Appl. No. 11/101,532 entitled "Control System and Method," by Anthony Grichnik et al., filed on Apr. 8, 2005.
U.S. Appl. No. 11/101,544 entitled "Diagnostic and Prognostic Method and System," by Anthony Grichnik et al., filed on Apr. 8, 2005.
U.S. Appl. No. /101,498 entitled "Probabilistic Modeling System for Product Design," by Michael Seskin et al., filed on Apr. 8, 2005.
Genichi Taguchi, Rajesh Jugulum, The Mahalanobis Taguchi Strategy, A Pattern Technology System, John Wiley & Sons, Inc., 2002.
National Institute of Health, "10-year CVD Risk Calculator" available at http://hin.nhlbi.nih.gov/atpiii/calculator.asp?usertype=prof, printed on Aug. 5, 2005.
Allen et al., "Supersaturated Designs That Maximize the Probability of Identifying Active Factors," 2003 American Statistical Association and the American Society for Quality, TECHNOMETRICS, vol. 45, No. 1, Feb. 2003, pp. 1-8.
April, Jay et al., "Practical Introduction to Simulation Optimization" Proceedings of the 2003 Winter Simulation Conference, pp. 71-78.
Bandte et al., "Viable Designs Through a Joint Probabilistic Estimation Technique," SAE International, and the American Institute of Aeronautics and Astronautics, Inc., Paper No. 1999-01-5623, 1999, pp. 1-11.
Beisl et al., "Use of Genetic Algorithm to Identify the Source Point of Seepage Slick Clusters Interpreted from Radarsat-1 Images in the Gulf of Mexico," Geoscience and Remote Sensing Symposium, 2004, Proceedings, 2004 IEEE International Anchorage, AK, Sep. 20-24, 2004, vol. 6, Sep. 20, 2004, pp. 4139-4142.
Berke et al., "Optimum Design of Aerospace Structural Components Using Neural Networks," Computers and Structures, vol. 48, No. 6, Sep. 17, 1993, pp. 1001-1010.
Bezdek, "Genetic Algorithm Guided Clustering," IEEE 0-7803-1899-4/94, 1994, pp. 34-39.
Brahma et al., "Optimization of Diesel Engine Operating Parameters Using Neural Networks," SAE Technical Paper Series, 2003-01-3228, Oct. 27-30, 2003 (11 pages).
Chau et al., "Use of runs test to access cardiovascular autonomic function in diabetic subjects," Abstract, Diabetes Care, vol. 17, Issue 2, pp. 146-148, available at http://care.diabetesjournals.org/cgi/content/abstract/17/2/146).
Chung et al., "Process Optimal Design in Forging by Genetic Algorithm," Journal of Manufacturing Science and Engineering, vol. 124, May 2002, pp. 397-408.
Cox et al., "Statistical Modeling for Efficient Parametric Yield Estimation of MOS VLSI Circuits," IEEE, 1983, pp. 242-245.
De Maesschalck et al., "The Mahalanobis Distance," Chemometrics and Intelligent Laboratory Systems, vol. 50, No. 1, Jan. 2000, pp. 1-18.
Dikmen et al., "Estimating Distributions in Genetic Algorithms," ISCIS 2003, LNCS 2869, 2003, pp. 521-528.
Gletsos et al., "A Computer-Aided Diagnostic System to Characterize CT Focal Liver Lesions: Design and Optimization of a Neural Network Classifier", IEEE Transactions on Information Technology in Biomedicine, vol. 7, No. 3, Sep. 2003 pp. 153-162.

Grichnik et al., "An Improved Metric for Robust Engineering," Proceedings of the 2007 International Conference on Scientific Computing, Las Vegas, NV (4 pages).
Grichnik et al., U.S. Appl. No. 11/529,267, filed Sep. 29, 2006, entitled Virtual Sensor Based Engine Control System and Method.
Grichnik et al., U.S. Appl. No. 11/730,363, filed Mar. 30, 2007, entitled Prediction Based Engine Control System and Method.
Grichnik et al., U.S. Appl. No. 11/812,164, filed Jun. 15, 2007, entitled Virtual Sensor System and Method.
Grichnik et al., U.S. Appl. No. 11/979,408, filed Nov. 2, 2007, entitled Virtual Sensor Network (VSN) System and Method.
Holland, John H., "Genetic Algorithms," Scientific American, Jul. 1992, pp. 66-72.
Hughes et al., "Linear Statistics for Zeros of Riemann's Zeta Function," C.R. Acad. Sci. Paris, Ser. 1335 (2002), pp. 667-670.
Ko et al., "Application of Artificial Neural Network and Taguchi Method to Perform Design in Metal Forming Considering Workability," International Journal of Machine Tools & Manufacture, vol. 39, No. 5, May 1999, pp. 771-785.
Kroha et al., "Object Server on a Parallel Computer," 1997 IEEE 0-8186-8147-0/97, pp. 284-288.
Mavris et al., "A Probabilistic Approach to Multivariate Constrained Robust Design Simulation," Society of Automotive Engineers, Inc., Paper No. 975508, 1997, pp. 1-11.
Obayashi et al, "Multiobjective Evolutionary Computation for Supersonic Wing-Shape Optimization," IEEE Transactions on Evolutionary Computation, vol. 4, No. 2, Jul. 2000, pp. 182-187.
Simpson et al., "Metamodels for Computer-Based Engineering Design: Survey & Recommendations," Engineering with Computers, 2001, vol. 17, pp. 129-150.
Song et al., "The Hyperellipsoidal Clustering Using Genetic Algorithm" 1997 IEEE International Conference on Intelligent Processing Systems, Oct. 28-31, 1997, Beijing, China, pp. 592-596.
Sytsma, Sid, "Quality and Statistical Process Control," available at http://www.sytsma.com/tqmtools/ctlchtprinciples.html, printed Apr. 7, 2005, 6 pages.
Taylor et al., "Guidelines for Evaluating and Expressing the Uncertainty of NIST Measurement Results," NIST Technical Note 1297, 1994 Edition, United States Dept. of Commerce, National Institute of Standards and Technology (25 pages).
Thompson, G.J. et al., "Neural Network Modelling of the Emissions and Performance of a Heavy-Duty Diesel Engine," Proc. Instu. Mech. Engrs., vol. 214, Part D (2000), pp. 111-126.
Traver, Michael L. et al., "A Neural Network-Based Virtual NOx Sensor for Diesel Engines," West Virginia University, Mechanical and Aerospace Engineering Dept., Morgantown, WV 26506-6101, 6106, 7 pages.
Traver, Michael L. et al., "Neural Network-Based Diesel Engine Emissions Prediction Using In-Cylinder Combustion Pressure," International Spring Fuels & Lubricants Meeting & Exposition, SAE Technical Paper Series, May 3-6, 1999, 17 pages.
Woodall, Tsui et al., "A Review and Analysis of the Mahalanobis-Taguchi System," Technometrics, Feb. 2003, vol. 45, No. 1 (15 pages).
Wu et al., "Cam-phasing Optimization Using Artificial Neural Networks as Surrogate Models--Fuel Consumption and Nox Emissions," SAE Technical Paper Series, 2006-01-1512, Apr. 3-6, 2006 (19 pages).
Yang et al., "Similar Cases Retrieval from the Database of Laboratory Test Results," Journal of Medical Systems, vol. 27, No. 3, Jun. 2003, pp. 271-282.
Yuan et al., "Evolutionary Fuzzy C-Means Clustering Algorithm," 1995 IEEE 0-7803-2461-7/95, pp. 2221-2226.

* cited by examiner

PROCESS MODEL BASED VIRTUAL SENSOR AND METHOD

TECHNICAL FIELD

This disclosure relates generally to computer based process modeling techniques and, more particularly, to virtual sensor systems and methods using process models.

BACKGROUND

Physical sensors are widely used in many products, such as modern work machines, to measure and monitor physical phenomena, such as temperature, speed, and emissions from motor vehicles. Physical sensors often take direct measurements of the physical phenomena and convert these measurements into measurement data to be further processed by control systems. Although physical sensors take direct measurements of the physical phenomena, physical sensors and associated hardware are often costly and, sometimes, unreliable. Further, when control systems rely on physical sensors to operate properly, a failure of a physical sensor may render such control systems inoperable. For example, the failure of a speed or timing sensor in an engine may result in shutdown of the engine entirely even if the engine itself is still operable.

Instead of direct measurements, virtual sensors are developed to process other various physically measured values and to produce values that are previously measured directly by physical sensors. For example, U.S. Pat. No. 5,386,373 (the '373 patent) issued to Keeler et al. on Jan. 31, 1995, discloses a virtual continuous emission monitoring system with sensor validation. The '373 patent uses a back propagation-to-activation model and a monte-carlo search technique to establish and optimize a computational model used for the virtual sensing system to derive sensing parameters from other measured parameters. However, such conventional techniques often fail to address inter-correlation between individual measured parameters, especially at the time of generation and/or optimization of computational models, or to correlate the other measured parameters to the sensing parameters.

Methods and systems consistent with certain features of the disclosed systems are directed to solving one or more of the problems set forth above.

SUMMARY OF THE INVENTION

One aspect of the present disclosure includes a method for a virtual sensor system. The method may include establishing a virtual sensor process model indicative of interrelationships between a plurality of sensing parameters and a plurality of measured parameters, and obtaining a set of values corresponding to the plurality of measured parameters. The method may also include calculating the values of the plurality of sensing parameters simultaneously based upon the set of values corresponding to the plurality of measured parameters and the virtual sensor process model, and providing the values of the plurality of sensing parameters to a control system.

Another aspect of the present disclosure includes a computer system for establishing a virtual sensor process model. The computer system may include a database configured to store information relevant to the virtual sensor process model and a processor. The processor may be configured to obtain data records associated with one or more input variables and the plurality of sensing parameters and to select the plurality of measured parameters from the one or more input variables. The processor may also be configured to generate a computational model indicative of interrelationships between the plurality of measured parameters and the plurality of sensing parameters and to determine desired statistical distributions of the plurality of measured parameters of the computational model. Further, the processor may be configured to recalibrate the plurality of measured parameters based on the desired statistical distributions to define a desired input space.

Another aspect of the present disclosure includes a work machine. The work machine may include a power source configured to provide power to the work machine and a control system configured to control the power source. The work machine may also include a virtual sensor system including a virtual sensor process model indicative of interrelationships between a plurality of sensing parameters and a plurality of measured parameters. The virtual sensor system may be configured to obtain a set of values corresponding to the plurality of measured parameters and to calculate the values of the plurality of sensing parameters simultaneously based upon the set of values corresponding to the plurality of measured parameters and the virtual sensor process model. The virtual sensor system may also be configured to provide the values of the plurality of sensing parameters to the control system. Further, the control system may control the power source based upon the values of the plurality of sensing parameters.

Another aspect of the present disclosure includes a computer-readable medium for use on a computer system configured to establish a virtual sensor process model. The computer-readable medium may have computer-executable instructions for performing a method. The method may include obtaining data records associated with one or more input variables and the plurality of sensing parameters, and selecting the plurality of measured parameters from the one or more input variables. The method may also include generating a computational model indicative of interrelationships between the plurality of measured parameters and the plurality of sensing parameters, determining desired statistical distributions of the plurality of measured parameters of the computational model, and recalibrating the plurality of measured parameters based on the desired statistical distributions to define a desired input space.

DETAILED DESCRIPTION

Reference will now be made in detail to exemplary embodiments, which are illustrated in the accompanying drawings. Wherever possible, the same reference numbers will be used throughout the drawings to refer to the same or like parts.

Figure 1:
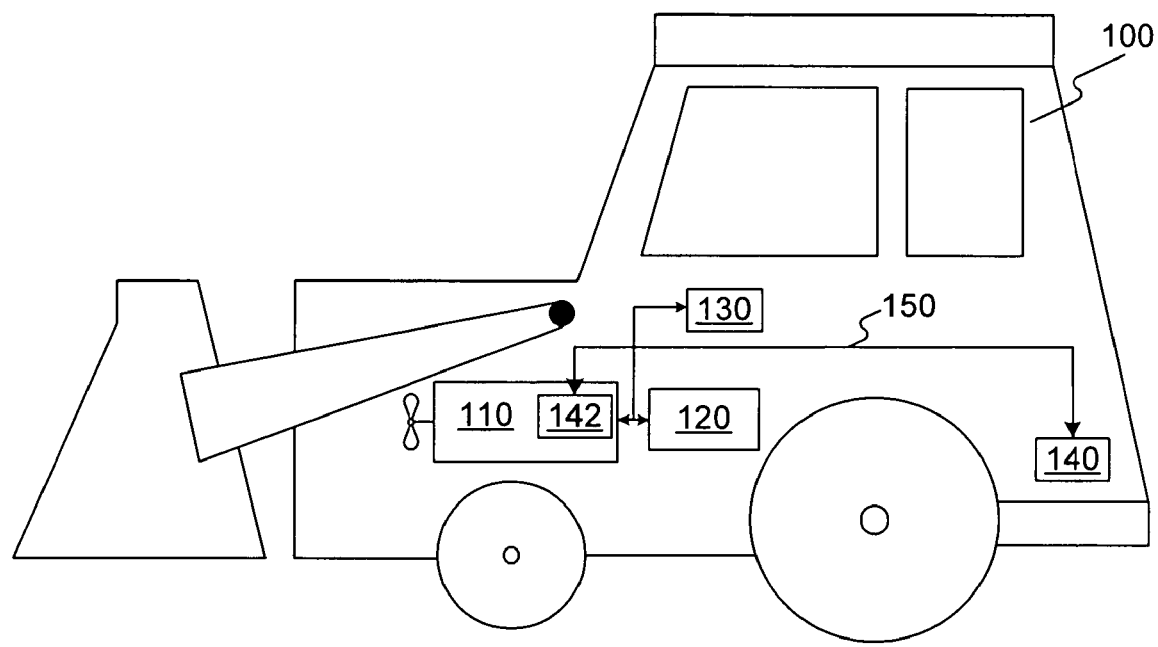
FIG. 1 illustrates an exemplary work machine in which features and principles consistent with certain disclosed embodiments may be incorporated.

FIG. 1 illustrates an exemplary work machine 100 in which features and principles consistent with certain disclosed embodiments may be incorporated. Work machine 100 may refer to any type of fixed or mobile machine that performs some type of operation associated with a particular industry, such as mining, construction, farming, transportation, etc. and operates between or within work environments (e.g., construction site, mine site, power plants and generators, on-highway applications, etc.). Non-limiting examples of mobile machines include commercial machines, such as trucks, cranes, earth moving vehicles, mining vehicles, backhoes, material handling equipment, farming equipment, marine vessels, aircraft, and any type of movable machine that operates in a work environment. Work machine 100 may also include any type of commercial vehicle such as cars, vans, and other vehicles. Although, as shown in FIG. 1, work machine 100 is an earth handling type work machine, it is contemplated that work machine 100 may be any type of work machine.

As shown in FIG. 1, work machine 100 may include an engine 110, an engine control module (ECM) 120, a virtual sensor system 130, physical sensors 140 and 142, and a data link 150. Engine 110 may include any appropriate type of engine or power source that generates power for work machine 100, such as an internal combustion engine or fuel cell generator. ECM 120 may include any appropriate type of engine control system configured to perform engine control functions such that engine 110 may operate properly. ECM 120 may include any number of devices, such as microprocessors or microcontrollers, memory modules, communication devices, input/output devices, storages devices, etc., to perform such control functions. Further, ECM 120 may also control other systems of work machine 100, such as transmission systems, and/or hydraulics systems, etc. Computer software instructions may be stored in or loaded to ECM 120. ECM 120 may execute the computer software instructions to perform various control functions and processes.

ECM 120 may be coupled to data link 150 to receive data from and send data to other components, such as engine 110, physical sensors 140 and 142, virtual sensor system 130, and/or any other components (not shown) of work machine 100. Data link 150 may include any appropriate type of data communication medium, such as cable, wires, wireless radio, and/or laser, etc. Physical sensor 140 may include one or more sensors provided for measuring certain parameters of work machine operating environment. For example, physical sensor 140 may include emission sensors for measuring emissions of work machine 100, such as Nitrogen Oxides ($NO_x$), Sulfur Dioxide ($SO_2$), Carbon Monoxide (CO), total reduced Sulfur (TRS), etc. In particular, $NO_x$ emission sensing and reduction may be important to normal operation of engine 110. Physical sensor 142, on the other hand, may include any appropriate sensors that are used inside engine 110 or other work machine components (not show) to provide various measured parameters about engine 110 or other components, such as temperature, speed, etc.

Virtual sensor system 130 may include any appropriate type of control system that generate values of sensing parameters based on a computational model and a plurality of measured parameters. The sensing parameters may refer to those measurement parameters that are directly measured by a particular physical sensor. For example, a physical $NO_x$ emission sensor may measure the $NO_x$ emission level of work machine 100 and provide values of $NO_x$ emission level, the sensing parameter, to other components, such as ECM 120. Sensing parameters, however, may also include any output parameters that may be measured indirectly by physical sensors and/or calculated based on readings of physical sensors. On the other hand, the measured parameters may refer to any parameters relevant to the sensing parameters and indicative of the state of a component or components of work machine 100, such as engine 110. For example, for the sensing parameter $NO_x$ emission level, measured parameters may include environmental parameters, such as compression ratios, turbocharger efficiency, after cooler characteristics, temperature values, pressure values, ambient conditions, fuel rates, and engine speeds, etc.

Figure 2:
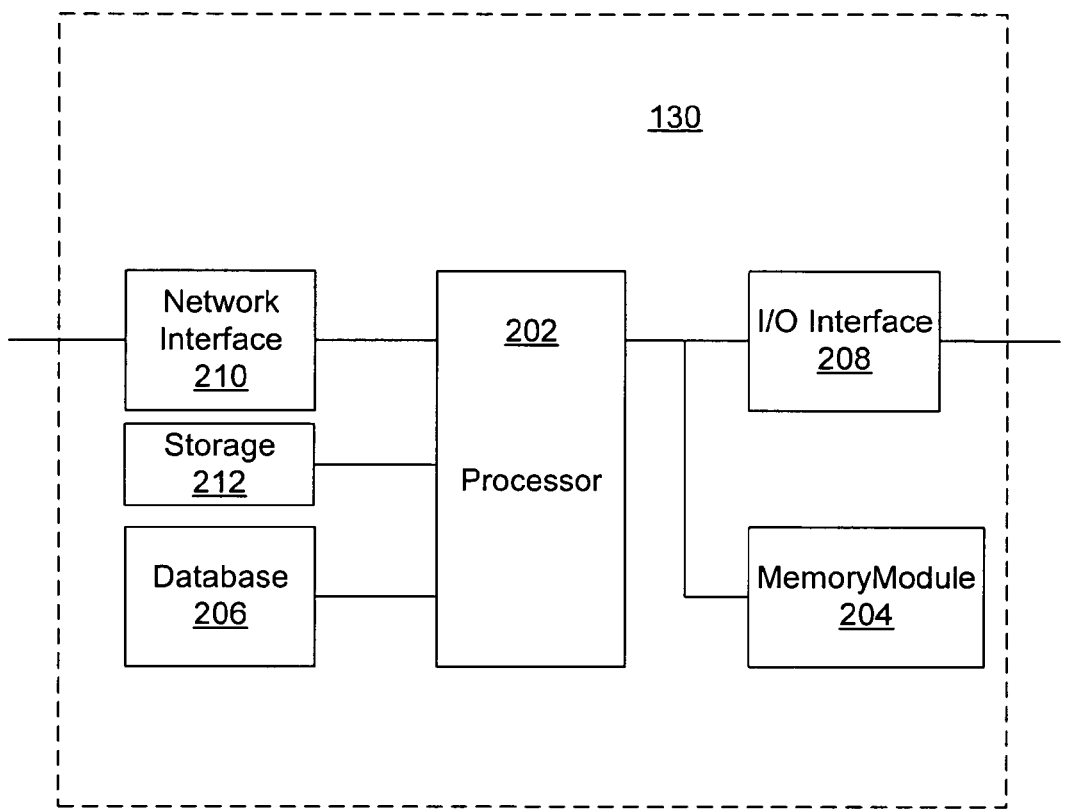
FIG. 2 illustrates a block diagram of an exemplary virtual sensor system consistent with certain disclosed embodiments.

Further, virtual sensor system 130 may be configured as a separate control system or, alternatively, may coincide with other control systems such as ECM 120. FIG. 2 shows an exemplary functional block diagram of virtual sensor system 130.

As shown in FIG. 2, virtual sensor system 120 may include a processor 202, a memory module 204, a database 206, an I/O interface 208, a network interface 210, and a storage 212. Other components, however, may also be included in virtual sensor system 120.

Processor 202 may include any appropriate type of general purpose microprocessor, digital signal processor, or microcontroller. Processor 202 may be configured as a separate processor module dedicated to controlling engine 110. Alternatively, processor 202 may be configured as a shared processor module for performing other functions unrelated to virtual sensors.

Memory module 204 may include one or more memory devices including, but not limited to, a ROM, a flash memory, a dynamic RAM, and a static RAM. Memory module 204 may be configured to store information used by processor 202. Database 206 may include any type of appropriate database containing information on characteristics of measured parameters, sensing parameters, mathematical models, and/or any other control information.

Further, I/O interface 208 may also be connected to data link 150 to obtain data from various sensors or other components (e.g., physical sensors 140 and 142) and/or to transmit data to these components and to ECM 120. Network interface 210 may include any appropriate type of network device capable of communicating with other computer systems based on one or more communication protocols. Storage 212 may include any appropriate type of mass storage provided to store any type of information that processor 202 may need to operate. For example, storage 212 may include one or more hard disk devices, optical disk devices, or other storage devices to provide storage space.

Figure 3:
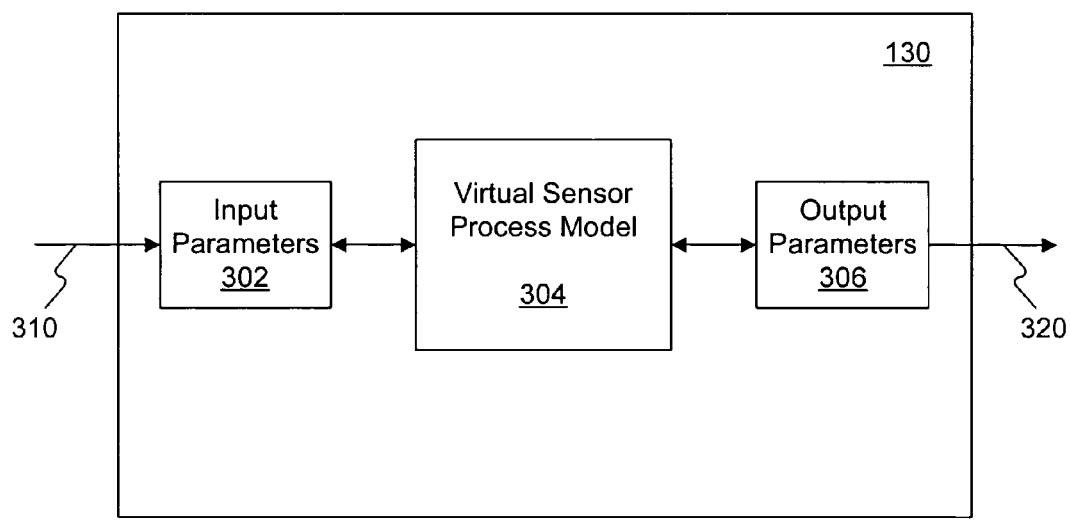
FIG. 3 illustrates a logical block diagram of an exemplary virtual sensor system consistent with certain disclosed embodiments.

As explained above, virtual sensor system 130 may include a process model to provide values of certain sensing parameters to ECM 120. FIG. 3 shows a logical block diagram of an exemplary virtual sensor system 130.

As shown in FIG. 3, a virtual sensor process model 304 may be established to build interrelationships between input parameters 302 (e.g., measured parameters) and output parameters 306 (e.g., sensing parameters). After virtual sensor process model 304 is established, values of input parameters 302 may be provided to virtual sensor process model 304 to generate values of output parameters 306 based on the given values of input parameters 302 and the interrelationships between input parameters 302 and output parameters 306 established by the virtual sensor process model 304.

In certain embodiments, virtual sensor system 130 may include a $NO_x$ virtual sensor to provide levels of $NO_x$ emitted from an exhaust system (not shown) of work machine 100.

Input parameters 302 may include any appropriate type of data associated with NO$_x$ emission levels. For example, input parameters 302 may include parameters that control operations of various response characteristics of engine 110 and/or parameters that are associated with conditions corresponding to the operations of engine 110. For example, input parameters 302 may include fuel injection timing, compression ratios, turbocharger efficiency, after cooler characteristics, temperature values (e.g., intake manifold temperature), pressure values (e.g., intake manifold pressure), ambient conditions (e.g., ambient humidity), fuel rates, and engine speeds, etc. Other parameters, however, may also be included. Input parameters 302 may be measured by certain physical sensors, such as physical sensor 142, or created by other control systems such as ECM 120. Virtual sensor system 130 may obtain values of input parameters 302 via an input 310 coupled to data link 150.

On the other hand, output parameters 306 may correspond to sensing parameters. For example, output parameters 306 of a NO$_x$ virtual sensor may include NO$_x$ emission level, and/or any other types of output parameters used by NO$_x$ virtual sensing application. Output parameters 306 (e.g., NO$_x$ emission level) may be sent to ECM 120 via output 320 coupled to data link 150.

Virtual sensor process model 304 may include any appropriate type of mathematical or physical model indicating interrelationships between input parameters 302 and output parameters 306. For example, virtual sensor process model 304 may be a neural network based mathematical model that is trained to capture interrelationships between input parameters 302 and output parameters 306. Other types of mathematic models, such as fuzzy logic models, linear system models, and/or non-linear system models, etc., may also be used. Virtual sensor process model 304 may be trained and validated using data records collected from a particular engine application for which virtual sensor process model 304 is established. That is, virtual sensor process model 304 may be established according to particular rules corresponding to a particular type of model using the data records, and the interrelationships of virtual sensor process model 304 may be verified by using part of the data records.

After virtual sensor process model 304 is trained and validated, virtual sensor process model 304 may be optimized to define a desired input space of input parameters 302 and/or a desired distribution of output parameters 306. The validated or optimized virtual sensor process model 304 may be used to produce corresponding values of output parameters 306 when provided with a set of values of input parameters 102. In the above example, virtual sensor process model 304 may be used to produce NO$_x$ emission level based on measured parameters, such as ambient humidity, intake manifold pressure, intake manifold temperature, fuel rate, and engine speed, etc.

Returning to FIG. 2, the establishment and operations of virtual sensor process model 304 may be carried out by processor 202 based on computer programs stored on or loaded to virtual sensor system 130. Alternatively, the establishment of virtual sensor process model 304 may be realized by other computer systems, such as ECM 120 or a separate general purpose computer configured to create process models. The created process model may then be loaded to virtual sensor system 130 for operations.

Figure 4:
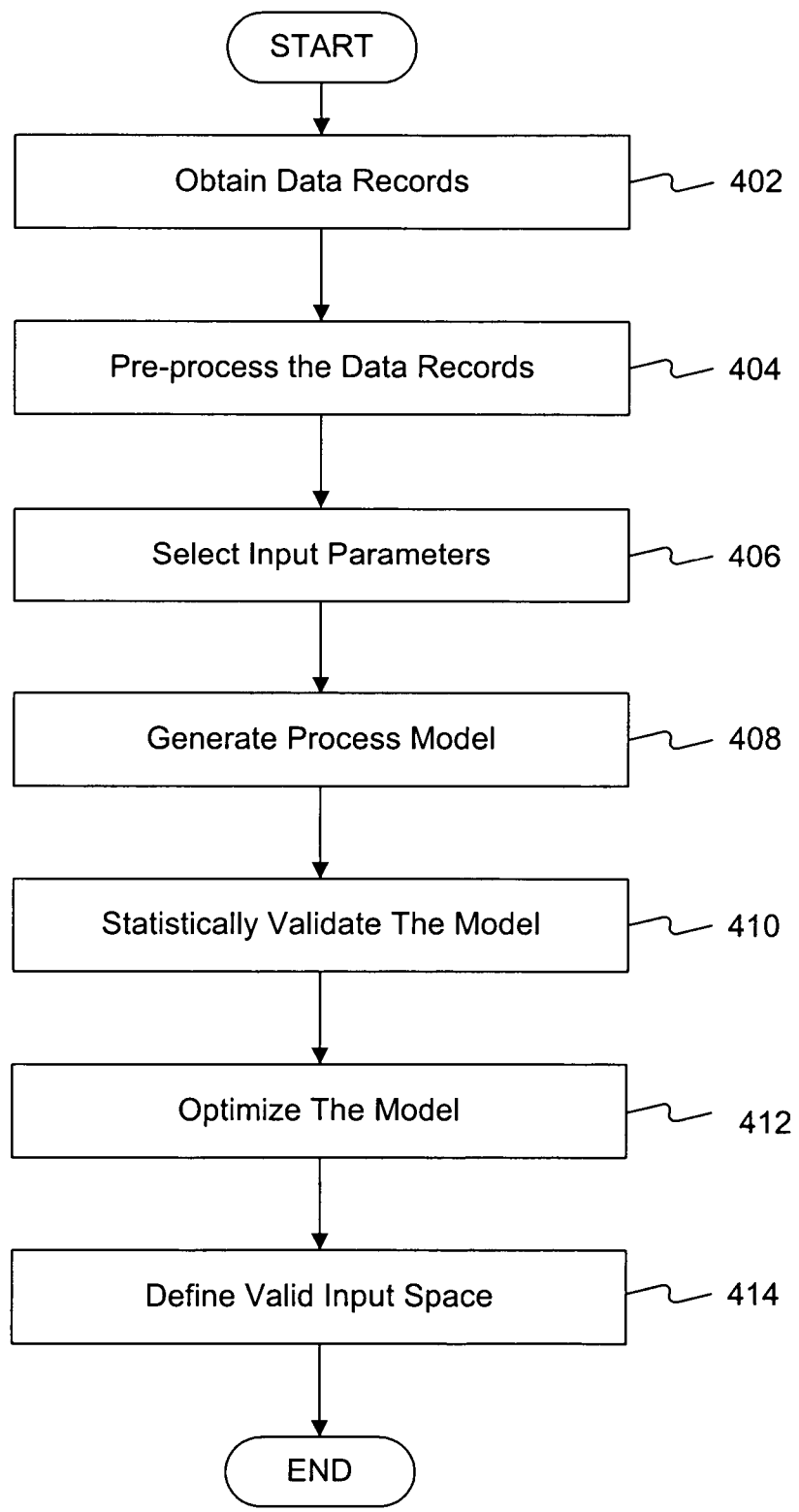
FIG. 4 illustrates a flowchart diagram of an exemplary virtual sensor model generation and optimization process consistent with certain disclosed embodiments.

Processor 202 may perform a virtual sensor process model generation and optimization process to generate and optimize virtual sensor process model 304. FIG. 4 shows an exemplary model generation and optimization process performed by processor 202.

As shown in FIG. 4, at the beginning of the model generation and optimization process, processor 202 may obtain data records associated with input parameters 302 and output parameters 306 (step 402). The data records may include information characterizing engine operations and emission levels including NO$_x$ emission levels. Physical sensor 140, such as physical NO$_x$ emission sensors, may be provided to generate data records on output parameters 306 (e.g., sensing parameters such as NO$_x$ levels). ECM 120 and/or physical sensor 142 may provide data records on input parameters 302 (e.g., measured parameters, such as intake manifold temperature, intake manifold pressure, ambient humidity, fuel rates, and engine speeds, etc.). Further, the data records may include both input parameters and output parameters and may be collected based on various engines or based on a single test engine, under various predetermined operational conditions.

The data records may also be collected from experiments designed for collecting such data. Alternatively, the data records may be generated artificially by other related processes, such as other emission modeling or analysis processes. The data records may also include training data used to build virtual sensor process model 304 and testing data used to validate virtual sensor process model 304. In addition, the data records may also include simulation data used to observe and optimize virtual sensor process model 304.

The data records may reflect characteristics of input parameters 102 and output parameters 106, such as statistic distributions, normal ranges, and/or precision tolerances, etc. Once the data records are obtained (step 402), processor 202 may pre-process the data records to clean up the data records for obvious errors and to eliminate redundancies (step 404). Processor 202 may remove approximately identical data records and/or remove data records that are out of a reasonable range in order to be meaningful for model generation and optimization. After the data records have been pre-processed, processor 202 may select proper input parameters by analyzing the data records (step 406).

The data records may be associated with many input variables, such as variables corresponding to fuel injection timing, compression ratios, turbocharger efficiency, after cooler characteristics, various temperature parameters, various pressure parameters, various ambient conditions, fuel rates, and engine speeds, etc. The number of input variables may be greater than the number of a particular set of input parameters 102 used for virtual sensor process model 304, that is, input parameters 102 may be a subset of the input variables. For example, input parameter 302 may include intake manifold temperature, intake manifold pressure, ambient humidity, fuel rate, and engine speed, etc., of the input variables.

A large number of input variables may significantly increase computational time during generation and operations of the mathematical models. The number of the input variables may need to be reduced to create mathematical models within practical computational time limits. Additionally, in certain situations, the number of input variables in the data records may exceed the number of the data records and lead to sparse data scenarios. Some of the extra input variables may have to be omitted in certain mathematical models such that practical mathematical models may be created based on reduced variable number.

Processor 202 may select input parameters 302 from the input variables according to predetermined criteria. For example, processor 202 may choose input parameters 302 by experimentation and/or expert opinions. Alternatively, in certain embodiments, processor 202 may select input parameters based on a mahalanobis distance between a normal data set and an abnormal data set of the data records. The normal data set and abnormal data set may be defined by processor 202 using any appropriate method. For example, the normal data set may include characteristic data associated with input parameters 302 that produce desired output parameters. On the other hand, the abnormal data set may include any characteristic data that may be out of tolerance or may need to be avoided. The normal data set and abnormal data set may be predefined by processor 202.

Mahalanobis distance may refer to a mathematical representation that may be used to measure data profiles based on correlations between parameters in a data set. Mahalanobis distance differs from Euclidean distance in that mahalanobis distance takes into account the correlations of the data set. Mahalanobis distance of a data set X (e.g., a multivariate vector) may be represented as $$MD_i = (X_i - \mu_x) \Sigma^{-1} (X_i - \mu_x)' \tag{1}$$

where $\mu_x$ is the mean of X and $\Sigma^{-1}$ is an inverse variance-covariance matrix of X. $MD_i$ weights the distance of a data point $X_i$ from its mean $\mu_x$ such that observations that are on the same multivariate normal density contour will have the same distance. Such observations may be used to identify and select correlated parameters from separate data groups having different variances.

Processor 202 may select input parameter 302 as a desired subset of input variables such that the mahalanobis distance between the normal data set and the abnormal data set is maximized or optimized. A genetic algorithm may be used by processor 202 to search input variables for the desired subset with the purpose of maximizing the mahalanobis distance. Processor 202 may select a candidate subset of the input variables based on a predetermined criteria and calculate a mahalanobis distance $MD_{normal}$ of the normal data set and a mahalanobis distance $MD_{abnormal}$ of the abnormal data set. Processor 202 may also calculate the mahalanobis distance between the normal data set and the abnormal data (i.e., the deviation of the mahalanobis distance $MD_x = MD_{normal} - MD_{abnormal}$). Other types of deviations, however, may also be used.

Processor 202 may select the candidate subset of input variables if the genetic algorithm converges (i.e., the genetic algorithm finds the maximized or optimized mahalanobis distance between the normal data set and the abnormal data set corresponding to the candidate subset). If the genetic algorithm does not converge, a different candidate subset of input variables may be created for further searching. This searching process may continue until the genetic algorithm converges and a desired subset of input variables (e.g., input parameters 302) is selected.

Optionally, mahalanobis distance may also be used to reduce the number of data records by choosing a part of data records that achieve a desired mahalanobis distance, as explained above.

After selecting input parameters 302 (e.g., intake manifold temperature, intake manifold pressure, ambient humidity, fuel rate, and engine speed, etc.), processor 202 may generate virtual sensor process model 304 to build interrelationships between input parameters 302 and output parameters 306 (step 408). In certain embodiments, virtual sensor process model 304 may correspond to a computational model, such as, for example, a computational model built on any appropriate type of neural network. The type of neural network computational model that may be used may include back propagation, feed forward models, cascaded neural networks, and/or hybrid neural networks, etc. Particular type or structures of the neural network used may depend on particular applications. Other types of computational models, such as linear system or non-linear system models, etc., may also be used.

The neural network computational model (i.e., virtual sensor process model 304) may be trained by using selected data records. For example, the neural network computational model may include a relationship between output parameters 306 (e.g., $NO_x$ emission level, etc.) and input parameters 302 (e.g., intake manifold temperature, intake manifold pressure, ambient humidity, fuel rate, and engine speed, etc.). The neural network computational model may be evaluated by predetermined criteria to determine whether the training is completed. The criteria may include desired ranges of accuracy, time, and/or number of training iterations, etc.

After the neural network has been trained (i.e., the computational model has initially been established based on the predetermined criteria), processor 202 may statistically validate the computational model (step 410). Statistical validation may refer to an analyzing process to compare outputs of the neural network computational model with actual or expected outputs to determine the accuracy of the computational model. Part of the data records may be reserved for use in the validation process.

Alternatively, processor 202 may also generate simulation or validation data for use in the validation process. This may be performed either independently of a validation sample or in conjunction with the sample. Statistical distributions of inputs may be determined from the data records used for modeling. A statistical simulation, such as Latin Hypercube simulation, may be used to generate hypothetical input data records. These input data records are processed by the computational model, resulting in one or more distributions of output characteristics. The distributions of the output characteristics from the computational model may be compared to distributions of output characteristics observed in a population. Statistical quality tests may be performed on the output distributions of the computational model and the observed output distributions to ensure model integrity.

Once trained and validated, virtual sensor process model 304 may be used to predict values of output parameters 306 when provided with values of input parameters 302. Further, processor 202 may optimize virtual sensor process model 304 by determining desired distributions of input parameters 302 based on relationships between input parameters 302 and desired distributions of output parameters 306 (step 412).

Processor 202 may analyze the relationships between desired distributions of input parameters 302 and desired distributions of output parameters 306 based on particular applications. For example, processor 202 may select desired ranges for output parameters 306 (e.g., $NO_x$ emission level that is desired or within certain predetermined range). Processor 202 may then run a simulation of the computational model to find a desired statistic distribution for an individual input parameter (e.g., one of intake manifold temperature, intake manifold pressure, ambient humidity, fuel rate, and engine speed, etc.). That is, processor 202 may separately determine a distribution (e.g., mean, standard variation, etc.) of the individual input parameter corresponding to the normal ranges of output parameters 306. After determining respective distributions for all individual input parameters, processor 202 may combine the desired distributions for all the individual input parameters to determine desired distributions and characteristics for overall input parameters 302.

Alternatively, processor 202 may identify desired distributions of input parameters 302 simultaneously to maximize the possibility of obtaining desired outcomes. In certain embodiments, processor 202 may simultaneously determine desired distributions of input parameters 302 based on zeta statistic. Zeta statistic may indicate a relationship between input parameters, their value ranges, and desired outcomes. Zeta statistic may be represented as $$\zeta = \sum_1^j \sum_1^i |S_{ij}| \left(\frac{\sigma_i}{\bar{x}_i}\right)\left(\frac{\bar{x}_j}{\sigma_j}\right),$$

where $\bar{x}_i$ represents the mean or expected value of an ith input; $\bar{x}_j$ represents the mean or expected value of a jth outcome; $\sigma_i$ represents the standard deviation of the ith input; $\sigma_j$ represents the standard deviation of the jth outcome; and $|S_{ij}|$ represents the partial derivative or sensitivity of the jth outcome to the ith input.

Under certain circumstances, $\bar{x}_i$ may be less than or equal to zero. A value of 3 $\sigma_i$ may be added to $\bar{x}_i$ to correct such problematic condition. If, however, $\bar{x}_i$ is still equal zero even after adding the value of 3 $\sigma_i$, processor 202 may determine that $\sigma_i$ may be also zero and that the process model under optimization may be undesired. In certain embodiments, processor 202 may set a minimum threshold for $\sigma_i$ to ensure reliability of process models. Under certain other circumstances, $\sigma_j$ may be equal to zero. Processor 202 may then determine that the model under optimization may be insufficient to reflect output parameters within a certain range of uncertainty. Processor 202 may assign an indefinite large number to $\zeta$.

Processor 202 may identify a desired distribution of input parameters 302 such that the zeta statistic of the neural network computational model (i.e., virtual sensor process model 304) is maximized or optimized. An appropriate type of genetic algorithm may be used by processor 202 to search the desired distribution of input parameters 302 with the purpose of maximizing the zeta statistic. Processor 202 may select a candidate set values of input parameters 302 with predetermined search ranges and run a simulation of virtual sensor process model 304 to calculate the zeta statistic parameters based on input parameters 302, output parameters 306, and the neural network computational model. Processor 202 may obtain $\bar{x}_i$ and $\sigma_i$ by analyzing the candidate set values of input parameters 302, and obtain $\bar{x}_j$ and $\sigma_j$ by analyzing the outcomes of the simulation. Further, processor 202 may obtain $|S_{ij}|$ from the trained neural network as an indication of the impact of the ith input on the jth outcome.

Processor 202 may select the candidate set of input parameters 302 if the genetic algorithm converges (i.e., the genetic algorithm finds the maximized or optimized zeta statistic of virtual sensor process model 304 corresponding to the candidate set of input parameters 302). If the genetic algorithm does not converge, a different candidate set values of input parameters 302 may be created by the genetic algorithm for further searching. This searching process may continue until the genetic algorithm converges and a desired set of input parameters 302 is identified. Processor 202 may further determine desired distributions (e.g., mean and standard deviations) of input parameters 302 based on the desired input parameter set. Once the desired distributions are determined, processor 202 may define a valid input space that may include any input parameter within the desired distributions (step 414).

In one embodiment, statistical distributions of certain input parameters may be impossible or impractical to control. For example, an input parameter may be associated with a physical attribute of a device, such as a dimensional attribute of an engine part, or the input parameter may be associated with a constant variable within virtual sensor process model 304 itself. These input parameters may be used in the zeta statistic calculations to search or identify desired distributions for other input parameters corresponding to constant values and/or statistical distributions of these input parameters.

Further, optionally, more than one virtual sensor process model may be established. Multiple established virtual sensor process models may be simulated by using any appropriate type of simulation method, such as statistical simulation. Output parameters 306 based on simulation of these multiple virtual sensor process models may be compared to select a most-fit virtual sensor process model based on predetermined criteria, such as smallest variance with outputs from corresponding physical sensors, etc. The selected most-fit virtual sensor process model 304 may be deployed in virtual sensor applications.

Returning to FIG. 1, after virtual sensor process model 304 is trained, validated, optimized, and/or selected, ECM 120 and virtual sensor system 130 may provide control functions to relevant components of work machine 100. For example, ECM 120 may control engine 110 according to $NO_x$ emission level provided by virtual sensor system 130, and, in particular, by virtual sensor process model 304.

Figure 5:
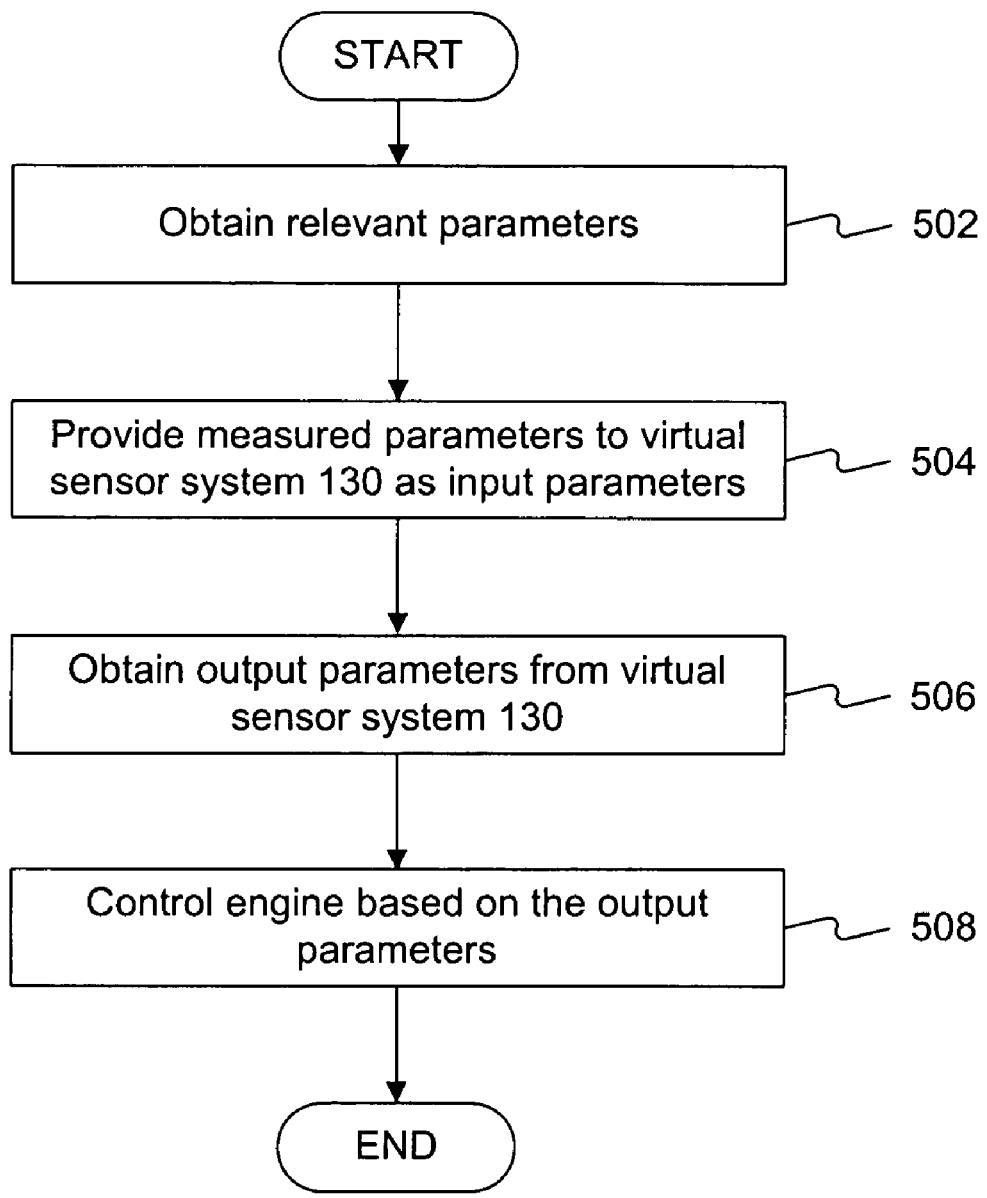
FIG. 5 shows a flowchart diagram of an exemplary control process consistent with certain disclosed embodiments.

In certain embodiments, virtual sensor system 130 may be used to replace corresponding physical sensors. For example, virtual sensor system 130 may replace one or more $NO_x$ emission sensors used by ECM 120. ECM 120 may perform a control process based on virtual sensor system 130. FIG. 5 shows an exemplary control process performed by ECM 120.

As shown in FIG. 5, ECM 120 may control and/or facilitate physical sensors 140 and/or 142 and engine 110 to measure relevant parameters, such as intake manifold temperature, intake manifold pressure, ambient humidity, fuel rate, and engine speed, etc. (step 502). After intake manifold temperature, intake manifold pressure, ambient humidity, fuel rate, and engine speed have been measured, ECM 120 may provide these measured parameters to virtual sensor system 130 (step 504). ECM 120 may provide the measured parameters on data link 150 such that virtual sensor system 130 may obtain the measured parameters from data link 150. Alternatively, virtual sensor system 130 may read these measured parameters from data link 150 or from other physical sensors or devices directly.

As explained above, virtual sensor system 130 includes virtual sensor process model 304. Virtual sensor system 130 may provide the measured parameters (e.g., intake manifold temperature, intake manifold pressure, ambient humidity, fuel rate, and engine speed, etc.) to virtual sensor process model 304 as input parameters 302. Virtual sensor process model 304 may then provide output parameters 306, such as $NO_x$ emission level.

ECM 120 may obtain output parameters 306 (e.g., $NO_x$ emission level) from virtual sensor system 130 via data link 150 (step 506). In certain situations, ECM 120 may be unaware the source of output parameters 306. That is, ECM 120 may be unaware whether output parameters 306 are from virtual sensor system 130 or from physical sensors. For example, ECM 120 may obtain $NO_x$ emission level from data link 150 without discerning the source of such data. After ECM 120 obtains the $NO_x$ emission level from virtual sensor system 130 (step 506), ECM 120 may control engine 110 and/or other components of work machine 100 based on the $NO_x$ emission level (step 508). For example, ECM 120 may perform certain emission enhancing or minimization processes.

Figure 6:
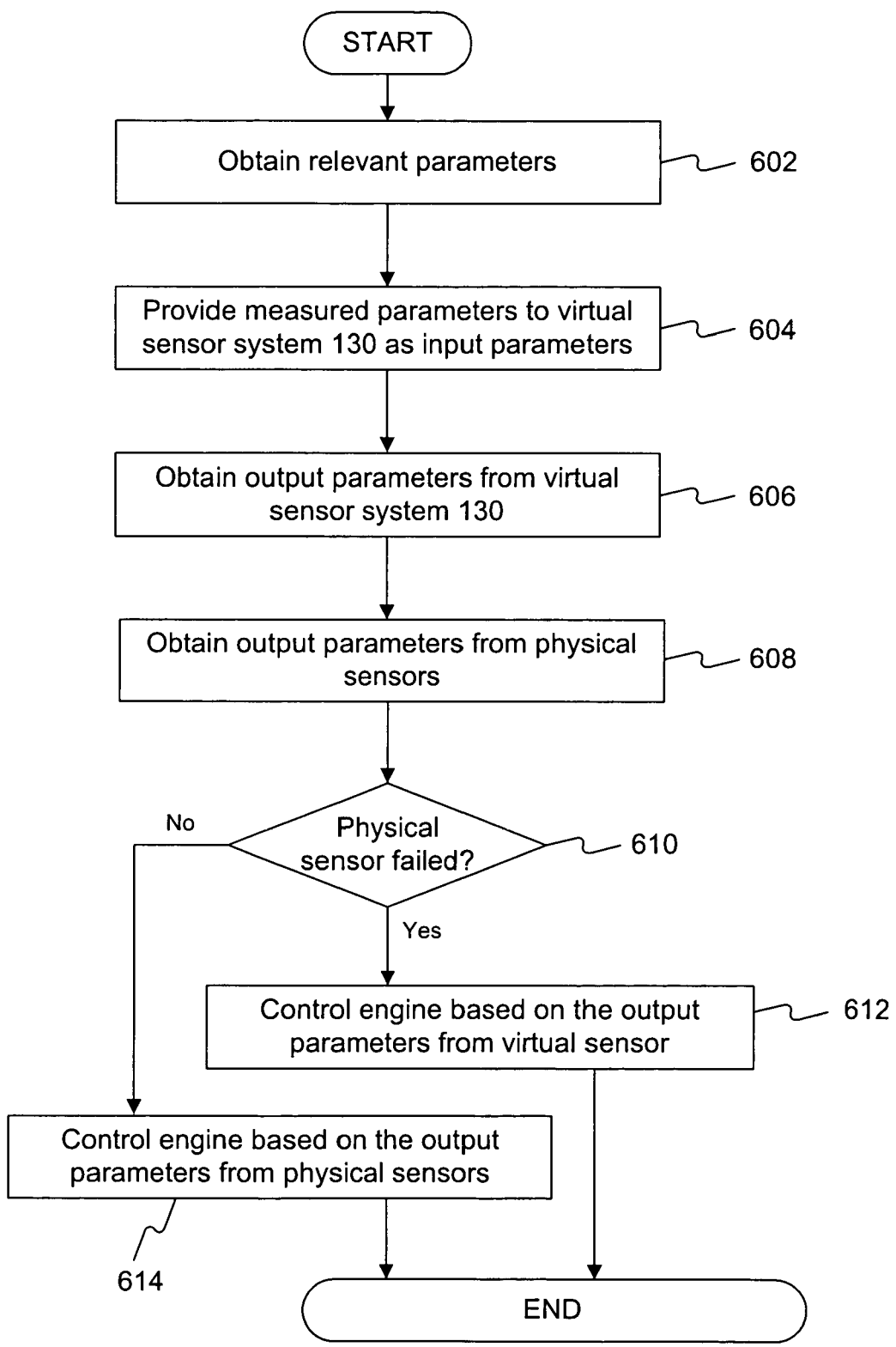
FIG. 6 shows a flowchart diagram of another exemplary control process consistent with certain disclosed embodiments.

In certain other embodiments, virtual sensor system 130 may be used in combination with physical sensors or as a back up for physical sensors. For example, virtual sensor system 130 may be used when one or more $NO_x$ emission sensors have failed. ECM 120 may perform a control process based on virtual sensor system 130 and corresponding physical sensors. FIG. 6 shows another exemplary control process performed by ECM 120.

As shown in FIG. 6, ECM 120 may control and/or facilitate physical sensors 140 and/or 142 and engine 110 to measure relevant parameters, such as intake manifold temperature, intake manifold pressure, ambient humidity, fuel rate, and engine speed, etc. (step 602). ECM 120 may also provide these measured parameters to virtual sensor system 130 (step 604). Virtual sensor system 130, especially virtual sensor process model 304, may then provide output parameters 306, such as $NO_x$ emission level.

Further, ECM 120 may obtain output parameters (e.g., $NO_x$ emission level) from virtual sensor system 130 via data link 150 (step 606). Additionally and/or concurrently, ECM 120 may also obtain $NO_x$ emission level from one or more physical sensors, such as physical sensor 142 (step 608). ECM 120 may check operational status on the physical sensors (step 610). ECM 120 may include certain logic devices to determine whether the physical sensors have failed. If the physical sensors have failed (step 610; yes), ECM 120 may obtain $NO_x$ emission level from virtual sensor system 130 and control engine 110 and/or other components of work machine 100 based on the $NO_x$ emission level from virtual sensor system 130 (step 612).

On the other hand, if the physical sensors have not failed (step 610; no), ECM 120 may use $NO_x$ emission level from the physical sensors to control engine 110 and/or other components of work machine 100 (step 614). Alternatively, ECM 120 may obtain $NO_x$ emission levels from virtual sensor system 130 and the physical sensors to determine whether there is any deviation between the $NO_x$ emission levels. If the deviation is beyond a predetermined threshold, ECM 120 may declare a failure and switch to virtual sensor system 130 or use a preset value that is neither from virtual sensor system 130 nor from the physical sensors.

In addition, ECM 120 may also obtain measuring parameters that may be unavailable in physical sensors 140 and 142. For example, virtual sensor system 130 may include a process model indicative of interrelationships between oxygen density in a certain geographical area (e.g., the state of Colorado, etc.) and space-based satellite and weather data. That is, virtual sensor system 130 may provide ECM 120 with measuring parameters, such as the oxygen density, that may be otherwise unavailable on physical sensors.

INDUSTRIAL APPLICABILITY

The disclosed systems and methods may provide efficient and accurate virtual sensor process models in substantially less time than other virtual sensing techniques. Such technology may be used in a wide range of virtual sensors, such as sensors for engines, structures, environments, and materials, etc. In particular, the disclosed systems and methods provide practical solutions when process models are difficult to build using other techniques due to computational complexities and limitations. When input parameters are optimized simultaneously to derive output parameters, computation may be minimized. The disclosed systems and methods may be used in combination with other process modeling techniques to significantly increase speed, practicality, and/or flexibility.

The disclosed systems and methods may provide flexible solutions as well. The disclosed virtual sensor system may used interchangeably with a corresponding physical sensor. By using a common data link for both the virtual sensor and the physical sensor, the virtual sensor model of the virtual sensor system may be trained by the same physical sensor that the virtual sensor system replaces. Control systems may operate based on either the virtual sensor system or the physical sensor without differentiating which one is the data source.

The disclosed virtual sensor system may be used to replace the physical sensor and may operate separately and independently of the physical sensor. The disclosed virtual sensor system may also be used to back up the physical sensor. Moreover, the virtual sensor system may provide parameters that are unavailable from a single physical sensor, such as data from outside the sensing environment.

The disclosed systems and methods may also be used by work machine manufacturers to reduce cost and increase reliability by replacing costly or failure-prone physical sensors. Reliability and flexibility may also be improved by adding backup sensing resources via the disclosed virtual sensor system. The disclosed virtual sensor techniques may be used to provide a wide range of parameters in components such as emission, engine, transmission, navigation, and/or control, etc. Further, parts of the disclosed system or steps of the disclosed method may also be used by computer system providers to facilitate or integrate other process models.

Other embodiments, features, aspects, and principles of the disclosed exemplary systems will be apparent to those skilled in the art and may be implemented in various environments and systems.

What is claimed is:

1. A method for a virtual sensor system, comprising:
   establishing a virtual sensor process model indicative of interrelationships between a plurality of sensing parameters and a plurality of measured parameters;
   obtaining a set of values corresponding to the plurality of measured parameters;
   calculating the values of the plurality of sensing parameters simultaneously based upon the set of values corresponding to the plurality of measured parameters and the virtual sensor process mode; and
   providing the values of the plurality of sensing parameters to a control system,
   wherein the establishing includes:
       obtaining data records associated with one or more input variables and the plurality of sensing parameters;
       selecting the plurality of measured parameters from the one or more input variables;
       generating a computational model indicative of the interrelationships between the plurality of measured parameters and the plurality of sensing parameters;
       determining desired statistical distributions of the plurality of measured parameters of the computational model; and
       recalibrating the plurality of measured parameters based on the desired statistical distributions to define a desired input space.

2. The method according to claim 1, wherein selecting further includes:
   pre-processing the data records; and
   using a genetic algorithm to select the plurality of measured parameters from the one or more input variables based on a mahalanobis distance between a normal data set and an abnormal data set of the data records.

3. The method according to claim 1, wherein generating further includes:
   creating a neural network computational model;
   training the neural network computational model using the data records; and
   validating the neural network computation model using the data records.

4. The method according to claim 1, wherein determining further includes:
   determining a candidate set of the measured parameters with a maximum zeta statistic using a genetic algorithm; and
   determining the desired distributions of the measured parameters based on the candidate set,
   wherein the zeta statistic $\zeta$ is represented by:

$$\zeta = \sum_{1}^{j}\sum_{1}^{i}|S_{ij}|\left(\frac{\sigma_i}{\bar{x}_i}\right)\left(\frac{\bar{x}_j}{\sigma_j}\right),$$

provided that $\bar{x}_i$ represents a mean of an ith input; $\bar{x}_j$ represents a mean of a jth output; $\sigma_i$ represents a standard deviation of the ith input; $\sigma_j$ represents a standard deviation of the jth output; and $|S_{ij}|$ represents sensitivity of the jth output to the ith input of the computational model.

5. The method according to claim 1, wherein the providing includes:
   separately obtaining values of the plurality of sensing parameters from a physical sensor;
   determining that the physical sensor has failed; and
   providing the values of the plurality of sensing parameters from the virtual sensor process model to the control system.

6. The method according to claim 1, wherein the plurality of sensing parameters include a $NO_x$ emission level.

7. The method according to claim 1, wherein the plurality of measured parameters include intake manifold temperature, intake manifold pressure, ambient humidity, fuel rates, and engine speeds.

8. A computer system for establishing a virtual sensor process model, comprising:
   a database configured to store information relevant to the virtual sensor process model; and
   a processor configured to:
      obtain data records associated with one or more input variables and the plurality of sensing parameters;
      select the plurality of measured parameters from the one or more input variables;
      generate a computational model indicative of interrelationships between the plurality of measured parameters and the plurality of sensing parameters;
      determine desired statistical distributions of the plurality of measured parameters of the computational model; and
      recalibrate the plurality of measured parameters based on the desired statistical distributions to define a desired input space.

9. The computer system according to claim 8, wherein, to select the plurality of measured parameters, the processor is further configured to:
   pre-process the data records; and
   use a genetic algorithm to select the plurality of measured parameters from the one or more input variables based on a mahalanobis distance between a normal data set and an abnormal data set of the data records.

10. The computer system according to claim 8, wherein, to generate the computational model, the processor is further configured to:
    create a neural network computational model;
    train the neural network computational model using the data records; and
    validate the neural network computation model using the data records.

11. The computer system according to claim 8, wherein, to determine the respective desired statistical distributions, the processor is further configured to:
    determine a candidate set of the measured parameters with a maximum zeta statistic using a genetic algorithm; and
    determine the desired distributions of the measured parameters based on the candidate set,
    wherein the zeta statistic $\zeta$ is represented by:

$$\zeta = \sum_{1}^{j}\sum_{1}^{i}|S_{ij}|\left(\frac{\sigma_i}{\bar{x}_i}\right)\left(\frac{\bar{x}_j}{\sigma_j}\right),$$

provided that $\bar{x}_i$ represents a mean of an ith input; $\bar{x}_j$ represents a mean of a jth output; $\sigma_i$ represents a standard deviation of the ith input; $\sigma_j$ represents a standard deviation of the jth output; and is $|S_{ij}|$ represents sensitivity of the jth output to the ith input of the computational model.

12. A machine, comprising:
    a power source configured to provide power to the machine;
    a control system configured to control the power source; and
    a virtual sensor system including a virtual sensor process model indicative of interrelationships between a plurality of sensing parameters and a plurality of measured parameters, the virtual sensor system being configured to:
       obtain a set of values corresponding to the plurality of measured parameters;
       calculate the values of the plurality of sensing parameters simultaneously based upon the set of values corresponding to the plurality of measured parameters and the virtual sensor process model; and
       provide the values of the plurality of sensing parameters to the control system, wherein the virtual sensor process model is established by:
          obtaining data records associated with one or more input variables and the plurality of sensing parameters;
          selecting the plurality of measured parameters from the one or more input variables;
          generating a computational model indicative of the interrelationships between the plurality of measured parameters and the plurality of sensing parameters;
          determining desired statistical distributions of the plurality of measured parameters of the computational model; and
          recalibrating the plurality of measured parameters based on the desired statistical distributions to define a desired input space,
    wherein the control system controls the power source based upon the values of the plurality of sensing parameters.

13. The machine according to claim 12, wherein selecting further includes:
  pre-processing the data records; and
  using a genetic algorithm to select the plurality of measured parameters from the one or more input variables based on a mahalanobis distance between a normal data set and an abnormal data set of the data records.

14. The machine according to claim 12, wherein generating further includes:
  creating a neural network computational model;
  training the neural network computational model using the data records; and
  validating the neural network computation model using the data records.

15. The machine according to claim 12, wherein determining further includes:
  determining a candidate set of the measured parameters with a maximum zeta statistic using a genetic algorithm; and
  determining the desired distributions of the measured parameters based on the candidate set,
  wherein the zeta statistic $\zeta$ is represented by:

$$\zeta = \sum_{1}^{j}\sum_{1}^{i} |S_{ij}|\left(\frac{\sigma_i}{\bar{x}_i}\right)\left(\frac{\bar{x}_j}{\sigma_j}\right),$$

provided that $\bar{x}_i$ represents a mean of an ith input; $\bar{x}_j$ represents a mean of a jth output; $\sigma_i$ represents a standard deviation of the ith input; $\sigma_j$ represents a standard deviation of the jth output; and $|S_{ij}|$ represents sensitivity of the jth output to the ith input of the computational model.

16. The machine according to claim 12, wherein the plurality of sensing parameters include a $NO_x$ emission level.

17. The machine according to claim 12, wherein the power source includes an engine.

18. The machine according to claim 12, wherein the plurality of measured parameters include intake manifold temperature, intake manifold pressure, ambient humidity, fuel rates, and engine speeds.

19. The machine according to claim 12, further including:
  a data link between the control system and the virtual sensor system, wherein the virtual sensor system provides the values of the plurality of sensing parameters to the control system via the data link.

20. The machine according to claim 19, further including:
  one or more physical sensors configured to independently provide corresponding values of the plurality of sensing parameters to the control system via the data link.

21. The machine according to claim 20, wherein the control system is further configured to:
  determine that the one or more physical sensors have failed; and
  control the power source based upon the values of the plurality of sensing parameters from the virtual sensor system.

22. The machine according to claim 12, wherein the control system includes the virtual sensor system.

23. A computer-readable storage medium for use on a computer system configured to establish a virtual sensor process model, the computer-readable storage medium having computer-executable instructions, which when executed, cause the computer to perform a method comprising:
  obtaining data records associated with one or more input variables and the plurality of sensing parameters;
  selecting the plurality of measured parameters from the one or more input variables;
  generating a computational model indicative of interrelationships between the plurality of measured parameters and the plurality of sensing parameters;
  determining desired statistical distributions of the plurality of measured parameters of the computational model;
  recalibrating the plurality of measured parameters based on the desired statistical distributions to define a desired input space; and
  providing the virtual sensor process model with the desired input space for providing control functions in a control system.

24. The computer-readable storage medium according to claim 23, wherein the selecting includes:
  pre-processing the data records; and
  using a genetic algorithm to select the plurality of measured parameters from the one or more input variables based on a mahalanobis distance between a normal data set and an abnormal data set of the data records.

25. The computer-readable storage medium according to claim 23, wherein the generating includes:
  creating a neural network computational model;
  training the neural network computational model using the data records; and
  validating the neural network computation model using the data records.

26. The computer-readable storage medium according to claim 23, wherein the determining includes:
  determining a candidate set of the measured parameters with a maximum zeta statistic using a genetic algorithm; and
  determining the desired distributions of the measured parameters based on the candidate set,
  wherein the zeta statistic $\zeta$ is represented by:

$$\zeta = \sum_{1}^{j}\sum_{1}^{i} |S_{ij}|\left(\frac{\sigma_i}{\bar{x}_i}\right)\left(\frac{\bar{x}_j}{\sigma_j}\right),$$

provided that $\bar{x}_i$ represents a mean of an ith input; $\bar{x}_j$ represents a mean of a jth output; $\sigma_i$ represents a standard deviation of the ith input; $\sigma_j$ represents a standard deviation of the jth output; and $|S_{ij}|$ represents sensitivity of the jth output to the ith input of the computational model.

* * * * *